United States Patent Office 3,452,506
Patented July 1, 1969

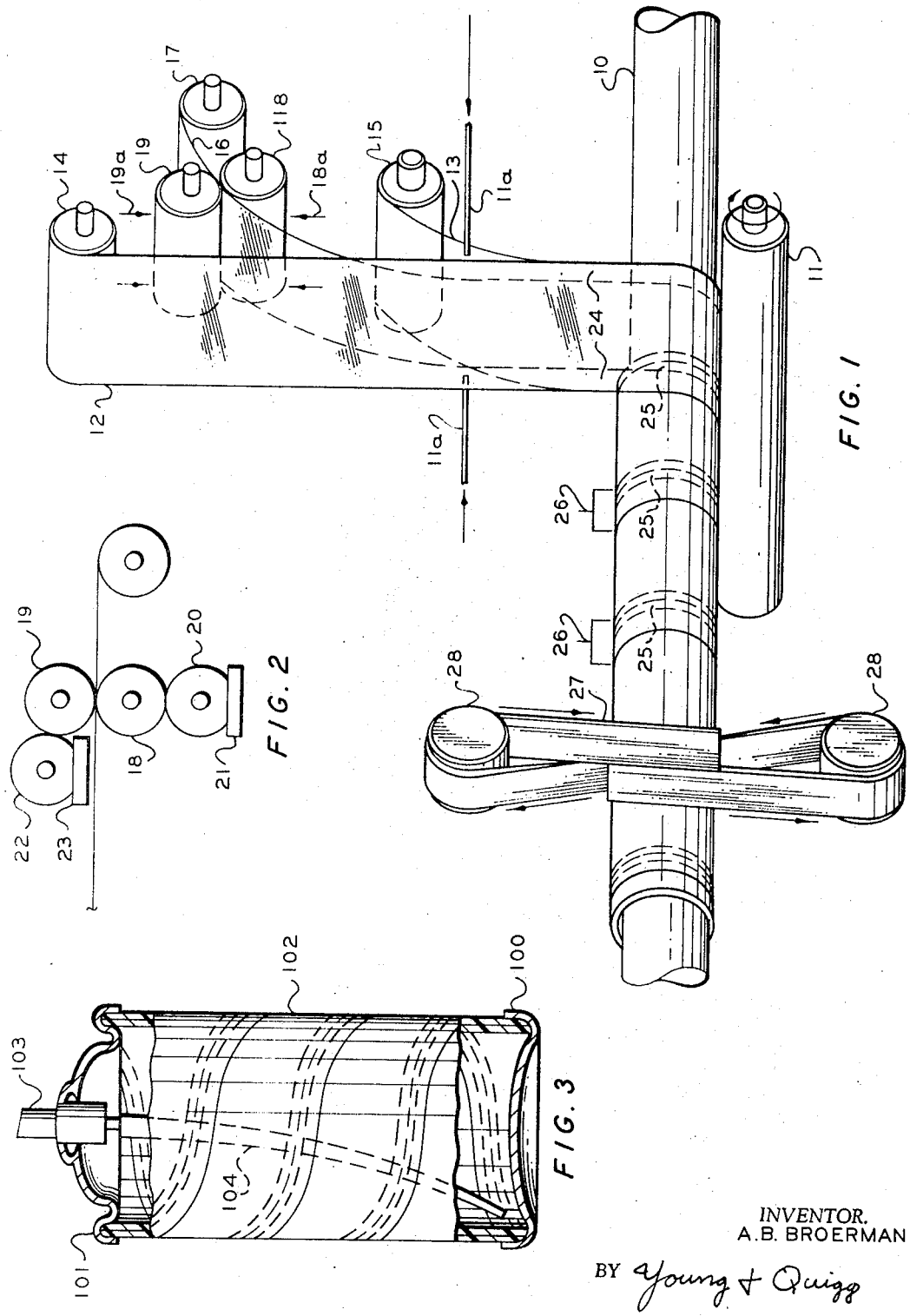

3,452,506
CONTAINERS
Arthur B. Broerman, Bartlesville, Okla., assignor to Phillips Petroleum Company, a corporation of Delaware
Filed July 20, 1967, Ser. No. 654,749
Int. Cl. B65b 43/06, 31/04; B32b 31/12
U.S. Cl. 53—29                        11 Claims

ABSTRACT OF THE DISCLOSURE

Container bodies are produced by spirally winding on a mandrel three juxtapositioned films, for example, a polyimide film positioned between two wider polyolefin films which overlap the edges of the polyimide film. As the juxtapositioned films are wound on the mandrel, the overlapping portions of the polyolefin film are sealed together and to polyolefin surfaces on adjacent convolutions.

---

This invention relates to containers. In another aspect, this invention relates to an improved method of manufacturing plastic container bodies. In still another aspect, this invention relates to improved plastic containers.

In the packaging of many liquid and semiliquid materials, particularly liquid materials under pressure such as aerosol bombs, metal containers are generally preferred. This is true because the metal containers not only impart the needed strength to withstand the internal pressure from within, but they are impermeable to the liquid contents, they resist the passage of harmful light rays to the contents, and they are rugged so as to resist denting, weathering and other damaging effects to which a container is subjected during handling, shipment, and the like.

The general disadvantages of metal containers are: (1) they are expensive, and (2) they are nontransparent and nontranslucent and one cannot visibly determine the level of the contents within the can.

Because conventional thermoplastic resins lack many of the advantages of metal containers such as strength, impermeability, etc., they have found no substantial use as construction materials for pressurized containers. However, it is desirable to have plastic containers for use as pressurized vessels.

Therefore, one object of this invention is to provide a method of making a novel plastic container body which is particularly suitable for holding contents under pressure.

Another object of this invention is to provide a novel plastic container which has sufficient strength, impermeability to liquid, and translucence to be ideally suitable as a dispensing package for pressurized materials.

According to one imbodiment of this invention, improved plastic container bodies are produced by spirally winding three juxtapositioned plastic sheets on a mandrel. The juxtapositioned sheets comprise an inner high strength material, preferably a polyimide film disposed between two wider sheets made from thermoplastic polymeric material. The juxtapositioned sheets are wound on the mandrel so that the edges of the high strength sheet will overlap the edges of the wound high strength material on adjacent convolutions, and the thermoplastic sheets in contact on the resulting wound spiral are heat sealed together to form a very strong container body.

According to another embodiment of this invention, improved containers are produced from the spirally wound container bodies made by the first embodiment of this invention.

This invention can be more easily understood by a study of the drawings in which:

FIGURE 1 is a schematic illustration of the process of this invention.

FIGURE 2 is an illustration of the preferred adhesive applying device that can be used with this invention.

FIGURE 3 is a sectional view of a preferred container of this invention.

Now referring to FIGURE 1, smooth surfaced mandrel 10 receives a spiral wrapping of juxtapositioned films as will be described below. Heated press roller 11 and hot air blowers 11a are positioned adjacent mandrel 10, and function to heat seal adjacently positioned thermoplastic material spirally wound on mandrel 10.

Continuous thermoplastic films 12 and 13 pass from rolls 14 and 15 respectively to mandrel 10. Films 12 and 13 are preferably made of poly-1-olefins such as polyethylene, polypropylene, polybutene-1 and copolymers thereof. These poly-1-olefins can be produced according to the method described in U.S. 2,825,721, Hogan and Banks. Other thermoplastic materials which are suitable for use in this invention include polyvinyl chloride and other chlorinated vinyl containing polymers and copolymers; polystyrene and other vinyl aromatic polymers and copolymers. These thermoplastic films will generally have a thickness of from ½ to 10 mils, preferably ½ to 4 mils each. Even though any of the above thermoplastic polymeric material can be used in this invention, the preferred embodiment will be described with particular reference to polypropylene.

A continuous high strength strip 16 passes from roller 17. Any high strength sheet or web can be used in the practice of this invention. Suitable high strength materials include plastic webs such as oriented polypropylene, Mylar (trademark for a condensation product of ethylene glycol and terephthalic acid), nylons such as nylon 6 (polycondensation product of caprolactam), and polyimides. Other suitable high strength materials include high temperature interlocking continuous filament sheets which are advantageously made from nylon or a polyimide which results from the polycondensation reaction of an aromatic tetrabasic acid and an aromatic diamine. This high temperature fibrous material can be obtained in filamentary or woven form from E. I. du Pont de Nemours and Company, under the trade name of Nomex. Preferably the woven form will have ¹⁄₆₄ to ⅛-inch mesh size and the individual filaments of the yarn which make up the woven fabric will have a denier in the range of 50 to 400.

Any of the above-listed high strength materials can be used in the practice of this invention; however, the preferred high strength material is the polyimide hereinafter described. This polyimide film is made from the polycondensation reaction between an aromatic tetrabasic acid and aromatic diamine and can be obtained from E. I. du Pont de Nemours and Company under the trade name of Kapton and will be specifically referred to in the description of FIGURE 1. This polyimide film is a transparent amber colored film having a very high tensile strength. It has been found that this amber colored film will effectively filter out ultraviolet radiation. As shown in FIGURE 1, the polyimide film is centered between the wider polypropylene films. It is preferred that the polyimide film be from ½ to 10 mils, preferably ½ to 8 mils, in thickness.

Film 16 passes between roller coaters 18 and 19 whereby continuous coating of adhesive is applied on both sides thereof. Any conventional plastic adhesive can be used; however, epoxy resin adhesives are generally preferred with this inventive process. Suitable epoxy resin adhesives include Epoxylite 3151 and Epoxylite 3152, manufactured by Epoxylite Corp. of El Monte, Calif. As illustrated by arrows 18a and 19a in FIGURE 1, the adhesive is applied to roller coaters 18 and 19 which, in turn, apply the adhesive to both sides of film 16.

FIGURE 2 illustrates a preferred method of applying adhesive to roller coaters 18 and 19. As illustrated in FIGURE 2, rollers 20 and 22 are in contact with roller coaters 18 and 19 respectively and are partially submerged within adhesive liquid vats 21 and 23, respectively. In this manner, roller coaters 18 and 19 receive a continuous coat of adhesive as they rotate in contact respectively with rollers 20 and 22. Even though the application of adhesive to film 16 is preferred, as will be described below, the process can be carried out without using an adhesive to bond the three films together.

As films 12, 16 and 13 advance around mandrel 10, they become juxtapositioned as illustrated in FIGURE 1, i.e., the polyimide film is positioned between the wider polypropylene films so that portions 24 of the polypropylene films overlap the edges of the polyimide film. The resulting juxtapositioned sheets are spirally wound on mandrel 10 in a manner to allow an overlap 25 of the edges of the polyimide film on adjacent convolutions. As will be described below, this overlap need only be slight in order that the resulting tubular body have a continuous amber colored polyimide covering.

As illustrated, hot air blowers 11a are positioned between films 12 and 13. Hot air passes from blowers 11a and softens the polypropylene adjacent the edges of films 12 and 13. Heated press roll 11 contacts the spirally winding juxtapositioned sheets causing the soft polypropylene to heat seal together. Thus, the overlap portions 25 effectively seal together, and the thermoplastic material in contact on adjacent convolutions will heat seal together along areas 26. As can be seen, the polyimide sheet need not be bonded to the polypropylene sheets because the heat sealing operation will effectively "sandwich" the polyimide therewithin. However, it is preferred that the polyimide sheet be bonded to the polypropylene sheets in the method described above to thereby provide added strength to the resulting container body.

Any method known in the art can be used to advance the resulting spirally wound cylindrical body along mandrel 10. For example, as illustrated in FIGURE 1, continuous belt 27 advances over pulleys 28 and is looped around the spirally wound cylinder on mandrel 10 causing the cylinder to rotate and advance to the left. As stated, this drive mechanism is conventional and well known in the art.

The resulting spirally wound cylinder is next cut into appropriate lengths to provide the desired container bodies. The very high tensile strength of the polyimide film will give the resulting container body the needed strength to withstand inernal pressures from propellant gas, for example, ranging from 5 to 120 p.s.i.g. in aerosol spray container, for example. As previously stated, the amber colored polyimide film will also effectively filter ultraviolet radiation and thereby prevent the unwanted deterioration of the contents within the spray container; however, the transparency or translucency of the juxtapositioned sheets will allow one to quickly determine the level of the contents within the container at a glance. The resulting juxtapositioned sheets also provide suitable barrier properties for most liquids.

Varying widths of plastic strips 12, 13 and 16 can be used, but it is generally preferred that sheets 12 and 13 be from ½ to 12, preferably from 1 to 8, inches wide and that sheet 16 be from ¼ to 11¾, preferably ¾ to 8½, inches wide to provide an overlap 24 from ¹⁄₃₂ to ½ inch. It is generally preferred that the juxtapositioned sheets be wound on mandrel 10 so that a minimum polyimide overlap 25 will result. It is preferred that overlap 25 be from ¹⁄₃₂ to ½, preferably ¹⁄₁₆ to ¼, inch depending upon the particular application. The resulting thermoplastic film overlap 26 should be sufficient to provide an effective heat seal beween adjacent thermoplastic surfaces. As apparent, area 26 is determined by the length of overlaps 24 and 25 and is generally from ³⁄₃₂ to 1½ inches.

FIGURE 3 is a cross-sectional illustration of an aerosol spray can made from the above container body. As illustrated, metal bottom closure 100 and metal top closure 101 are affixed to the ends of the cylindrical body 102 made by the process of this invention. Closures 100 and 101 are crimped over the plastic cylinder walls by any method well known in the art. As illustrated, top closure 101 carries push button nozzle 103 attached to conduit 104. As is well known in the art, propellant gas under pressure will push liquid contents through conduit 104 when the nozzle is opened and the can is positioned upright. Other end closures can be used for different applications. For example, flat metal closures can be used for carbonated beverage cans. If desired, the closures can be plastic and heat sealed to the thermoplastic layers either on the inner or outer surfaces of the cylindrical body.

Even though the laminating process of this invention produces cylindrical bodies particularly adaptable for use as a pressurized container, the cylindrical body produced from the process as illustrated in FIGURE 1 can also be used in the manufacture of nonpressurized containers and in noncontainer applications, such as, for example, a high strength plastic conduit.

The following example is given to illustrate the process of this invention more clearly but it is not intended to unduly limit the scope thereof.

Referring to FIGURE 1, polypropylene sheets 12 and 13 are 6 inches wide and 5 mils thick and pass from rollers 14 and 15 respectively at 3 feet per second. Polyimide film 16 is 5¾ inches wide and 1 mil thick and passes from roller 17 between roller coaters 18 and 19 wherein an epoxy resin coating approximately 1 mil thick is applied to both sides thereof. Film 16 is centered between films 12 and 13 to form overlap portions 24 which are ⅛ inch. Mandrel 10 is 9½ inches in diameter. Heated press roll 11 is maintained at 300° F. and effectively presses adjacent polypropylene surfaces together along areas 26 after these areas have been heated with an 800° F. air stream from nozzles 11a to heat a sealing temperature as the resulting formed cylinder is rotated at about 1.19 r.p.s. on mandrel 10 and moves at about 0.56 foot per second by the action of belt 27 and pulleys 28. The resulting polyimide overlap 25 is ⅛ inch long. This laminating operation will therefore produce a spiral cylinder of the juxtapositioned film which is 9½ inches in inside diameter at the rate of about 34 feet per minute.

Reasonable variation and modification are possible within the scope of the foregoing disclosure, drawings and claims to the invention without parting from the scope thereof.

I claim:
1. A method of making a tubular body comprising:
 (a) placing in a juxtapositioned relationship a first strip of high strength material between second and third strips which are wider than said first strip and made from thermoplastic polymeric material, in a manner so that said thermoplastic strips overlap the edges of said high strength strip to yield opposed overlapped portions;
 (b) spirally winding the juxtapositioned strips on a mandrel so that the edges of the high strength strip on adjacent convolutions will overlap;
 (c) heat sealing together said opposed overlapped portions and all contacting thermoplastic surfaces on adjacent convolutions.

2. The method of claim 1 further comprising coating both sides of said first strip with an adhesive material before placing said first, second, and third strips in said juxtapositioned relationship.

3. The method of claim 1 wherein said thermoplastic material is a poly-1-olefin.

4. The method of claim 1 wherein said first strip of high strength material comprises a continuous fibrous strip composed of polyimide fibers formed as a poly condensation reaction product of an aromatic tetrabasic acid and an aromatic diamine.

5. The method of claim 1 wherein said first strip of high strength material comprises a polyimide film formed as a condensation reaction product of an aromatic tetrabasic acid and an aromatic diamine.

6. The method of claim 1 wherein said first strip of high strength material comprises a film made of oriented polypropylene.

7. The method of claim 1 wherein said first strip of high strength material comprises a film made from a condensation product of ethylene glycol and terephthalic acid.

8. The method of claim 1 wherein said first strip of high strength material comprises a nylon film.

9. The method of claim 1 further comprising cutting said tubular body into smaller tubular sections.

10. The method of claim 9 further comprising sealing a closure on one end of at least one of said tubular sections to form a tubular container, filling said tubular container with a dispensable material, and sealing the open end of said tubular container.

11. The method of claim 10 wherein a gas is passed in said container with said dispensable material under pressure so that the internal pressure of the resulting sealed container is greater than atmospheric.

References Cited

UNITED STATES PATENTS

| 2,943,540 | 7/1960 | McBain | 229—4.5 X |
| 3,294,609 | 12/1966 | Foll | 156—190 |

THERON E. CONDON, *Primary Examienr.*

E. F. DESMOND, *Assistant Examiner.*

U.S. Cl. X.R.

53—36; 93—80, 94; 156—195